Oct. 27, 1970  V. SHANOK ET AL  3,535,736
EXTRUSION DIE
Filed July 7, 1967
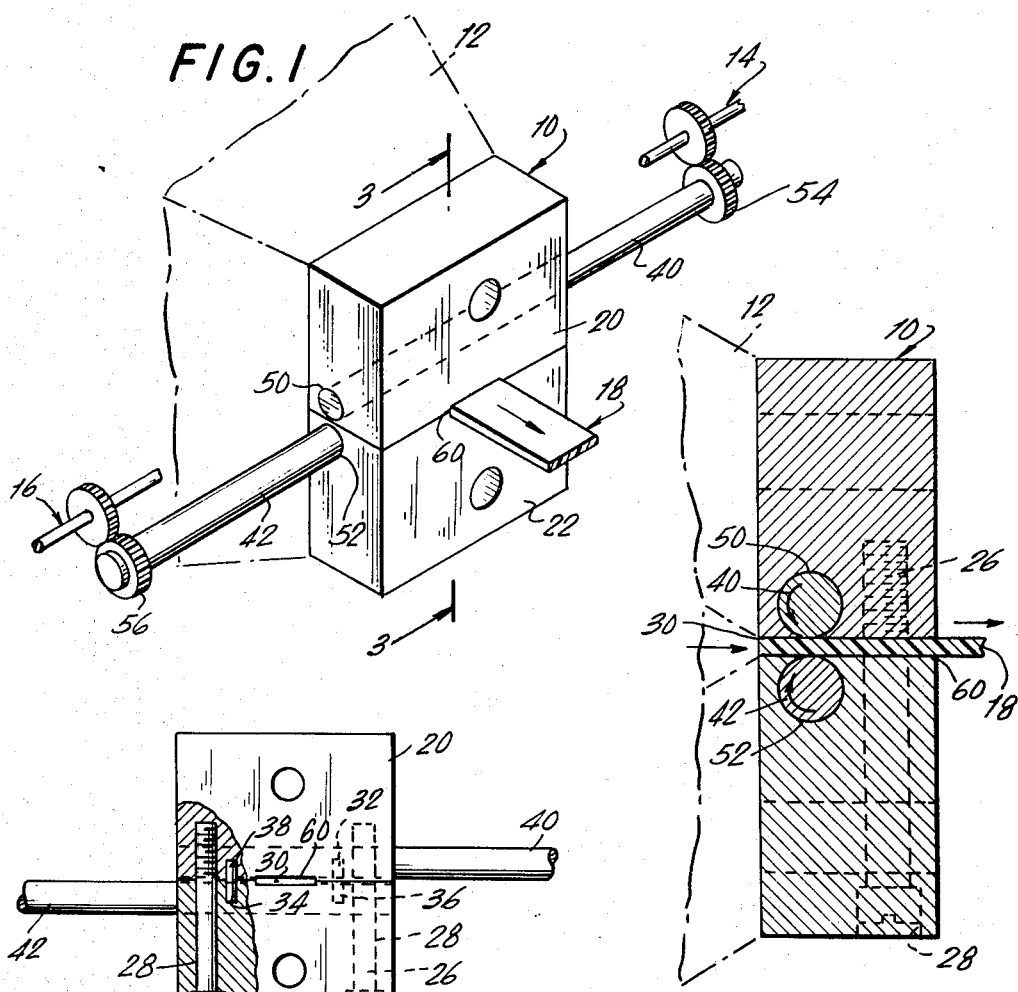
FIG. 1
FIG. 2
FIG. 3
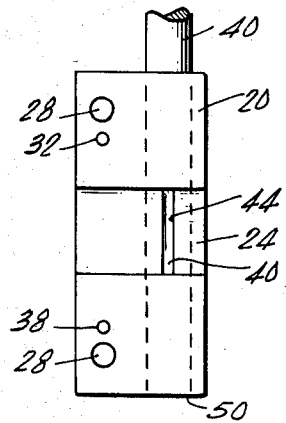
FIG. 4
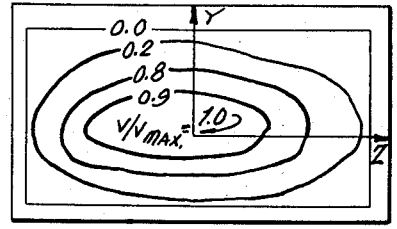
FIG. 5
INVENTORS
VICTOR SHANOK
JESSE P. SHANOK
BY Friedman & Goodman
ATTORNEYS

United States Patent Office 3,535,736
Patented Oct. 27, 1970

3,535,736
EXTRUSION DIE
Victor Shanok and Jesse P. Shanok, Brooklyn, N.Y., assignors to Glass Laboratories Company, a New York limited partnership
Filed July 7, 1967, Ser. No. 651,800
Int. Cl. B29f 3/012
U.S. Cl. 18—12                                                                                          4 Claims

ABSTRACT OF THE DISCLOSURE

This invention is concerned with providing a new and improved plastics extrusion die in which the die is adapted in such a manner as to result in a uniform flow of extruded matter from the die, i.e., one in which the isovels are substantially the same throughout the flow. Briefly, this is accomplished by providing oppositely disposed rollers, powered by conventional rotarizing means, in association with the flow of plastic as it emerges from the extrusion die.

BACKGROUND OF THE INVENTION

Field of the invention

This invention relates generally to new and improved extrusion dies. More particularly, this invention relates to new and improved plastics extrusion dies in which the problems of flow are substantially eliminated.

Description of the prior art

It is a serious problem in conventional extrusion dies that there exist in the flow channels thereof regions of no flow, commonly known as "dead spots." In this situation the isovels, or lines of constant velocity, pass from a point of maximum velocity to one of substantially zero velocity, i.e., regions of no flow. Many disadvantages result therefrom. For example, where the flow is two-dimensional, such as in a square-section hole, the shear rate (and therefore the shear stress) is not uniform in all directions but is highest in the directions parallel to the sides of the square and is lowest along the diagonals. The emerging stream swells more at the sides and less at the corners of the square, so the extrudate coming from the square hole is not only larger in cross-section, but is not even square. This is likewise true of the flow in a channel whose cross-section is rectangular. Moreover, the extrudate is often discolored and cools unevenly resulting in an inferior extruded product. The prior art has given little attention to improving the die design, but has, rather, directed its attention to adjusting conditions in the extruder itself with generally unsatisfactory results.

SUMMARY OF THE INVENTION

It is, therefore, among the principal objectives of this invention to eliminate the aforementioned prior art disadvantages by providing a plastics extrusion die in which the isovels are substantially equal, so that the velocity at the center of the flow is the same as at the exterior thereof.

In accordance with the present invention, a plastics extrusion die having a substantially rectangular channel is provided with a pair of oppositely disposed rollers, powered by conventional rotarizing means, said rollers acting in association with the flow of plastic as it passes through and emerges from the die with the result that substantially equivalent isovel values are obtained.

BRIEF DESCRIPTION OF THE DRAWING

The invention will be hereinafter more fully described with reference to the accompanying drawing, in which:

FIG. 1 is a view in perspective of the invention die showing its relative position with the extruder, shown by phantom lines, and the rotarizing means, partially fragmented;

FIG. 2 is a front view of the die, partially in cross-section and partially fragmented;

FIG. 3 is a side elevational view of the die in cross-section taken along line 3—3 of FIG. 1;

FIG. 4 is a bottom plan view of one-half of the invention die, partially fragmented; and FIG. 5 shows a conventional isovel pattern in a rectangular channel.

DESCRIPTION OF THE PREFERRED EMBODIMENTS

Referring now to the figures of the drawing, for purposes of illustration FIG. 1 depicts the invention die 10 in its environmental condition relative to the extrusion device 12 (partially shown by phantom lines), the rotarizing means 14 and 16, and an extruded plastic strip 18. The die 10 generally rectangular in shape comprises a pair of generally rectangular stainless steel blocks 20 and 22. Each of the said blocks 20 and 22 define an open rectangular shaped shallow channel 24 (as in block 20, the channel for block 22 not being shown) along a longitudinal surface thereof and cut transversely therein so that when said blocks 20 and 22 are secured by means of threaded bolts 26 into associatingly threaded bores 28 a generally rectangular shaped channel 30 is formed throughout (FIGS. 2–4). To aid in the securement of said blocks opposing bosses 32 and 34 are provided adjacent to said bores 28, boss 32 on block 20 and boss 34 on block 22. These are adapted to register and engage with opposing boss-receiving apertures 36 and 38, respectively. The depth of channel 24 will vary with the thickness of the strip 18 desired when resulting channel 30 is formed, as will its width. The die 10 is also provided with a pair of opposing, parallel rollers 40 and 42, roller 40 coursing longitudinally through block 20 and roller 42 coursing longitudinally through block 22. Rollers 40 and 42, preferably stainless steel, are also parallel to channel 30 and are opened to said channel by means of rectangular slots cut in the opposing longitudinal walls of said channel in a generally central location. This is best shown by referring to FIG. 4 wherein roller 40 is shown communicating with channel 24 (channel 30 when the two blocks are joined) by means of rectangular slot 44 in block 20. Block 22 is similarly adapted. The width of slot 44 is just sufficient to cause the shallow entrance of roller 40 into channel 24. As mentioned, block 22 is similarly adapted. Rollers 40 and 42 are free to move in apertures 50 and 52, respectively, and are provided at their respective ends with worm gears 54 and 56. Said worm gears are connected to conventional rotarizing means 14 and 16, partially shown in FIG. 1, which supply the rotary power necessary to turn the rollers 40 and 42, respectively. Describing now the operation of the die 10, a flow of plastic is caused to proceed by suitable means through the extruder 12, partially shown, into channel 30 of die 10 in the direction of the arrows, as shown in FIG. 3. Acting in association with the flow of plastic are turning rollers 40 and 42 which protrude in an amount sufficient into channel 30 to push strip 18 along the said channel, roller 40 turning in a counterclockwise fashion and roller 42 in a clockwise fashioin. The plastic thence emerges from die mouth 60 as the extruded plastic strip 18 in the direction of the arrow as shown in FIGS. 1 and 3. The associated action of the rollers with the plastic flow has been found to result in a flow having the desired characteristic in which the isovels are substantially the same throughout producing a superior plastic strip with none of the prior art disadvantages as shown by FIG. 5. Therein it will be seen that the isovels vary along coordinates Y and Z going from a $V/V$ max.$=1.0$ at the center of the flow to an isovel value of 0.0 at the exterior surface of the flow, the velocity being specified in terms of these coordinates. Thus at isovel value 0.0 there is produced the prior art "dead spot" with the isovels increasing in value towards the center of the flow. By the method and die of this invention the prior art disadvantages have been overcome, so that "regions of no flow" or "dead spots" have been eliminated and a plastic strip of uniform properties and coloration has been obtained. Although rectangular blocks 20 and 22 and rollers 40 and 42 are preferably stainless steel, it is to be understood that any other suitable metal may be employed.

Having thus described the fundamental novel features of the invention as applied to a specific embodiment, it is to be understood that various changes may be made in the form of the device illustrated by those skilled in the art without departing from the scope and spirit thereof.

What is claimed is:

1. An extrusion die positionable at the outlet of an extrusion device and adapted to act upon a flow of plastic material passing therethrough so as to impart to that material a uniform velocity throughout, said die comprising a pair of die members which when joined together define generally central outlet means acting as an outlet for said flow of plastic material extruded through said die, turning means having substantially regular external surfaces positioned within each die member and partially opening into said outlet means via entrance means therefor so as to contact said flow of plastic material, means for turning said turning means in opposite directions and convergeable within said outlet means thereby simultaneously urging said flow of plastic material through said outlet means to produce an extruded plastic material of uniform properties and coloration.

2. An extrusion die according to claim 1 wherein each die further comprises a block shaped member each of which is provided with an elongated channel along one surface thereof, said channels being in confronting relation to define an elongated slot through said extrusion die to form said outlet means, said turning means further comprising a pair of rollers, one roller each being turningly positioned within a block member and traversing said block member for its entire width, said rollers lying one over the other and opening into said elongated slot by an elongated opening therefor provided in each block member in associated elongated relation with said elongated slot, whereby the surfaces of said rollers when turning converge within said elongated slot thereby simultaneously urging said flow of plastic material therethrough.

3. An extrusion die according to claim 2 wherein said block members are each generally rectangular shaped and each define an open generally rectangular shaped channel along a longitudinal surface thereof which define, when in confronting relation, a generally rectangular shaped slot, and wherein said elongated openings allowing entry of said rollers into said generally rectangular shaped slot each comprise a generally rectangular shaped slot substantially centrally located in the opposing longitudinal walls of said channel.

4. An extrusion die according to claim 3 wherein each of said slots is sufficient in width to cause the shallow entry of said rollers into said channel.

References Cited

UNITED STATES PATENTS

| 2,426,457 | 8/1947 | Koch | 18—12 |
| 2,515,201 | 7/1950 | Dulmage et al. | 18—12 |
| 2,819,493 | 1/1958 | Hawtin et al. | 18—12 XR |
| 2,767,437 | 10/1956 | Marshall | 18—12 XR |
| 2,771,637 | 11/1956 | Silvasy et al. | |

WILBUR L. McBAY, Primary Examiner